(12) United States Patent
Hanchi et al.

(10) Patent No.: US 6,536,265 B1
(45) Date of Patent: Mar. 25, 2003

(54) MICRO-TEXTURED GLIDE SLIDERS FOR SUPER-SMOOTH MEDIA

(75) Inventors: Jorge V. Hanchi, Minneapolis, MN (US); Zine-Eddine Boutaghou, Vadnais Heights, MN (US); Peter R. Segar, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 67 days.

(21) Appl. No.: 09/715,880

(22) Filed: Nov. 17, 2000

Related U.S. Application Data

(60) Provisional application No. 60/168,850, filed on Dec. 2, 1999.

(51) Int. Cl.[7] .............................. G01B 5/28; G01B 7/34
(52) U.S. Cl. ........................................................ 73/105
(58) Field of Search ........................ 73/105; 360/236.6, 360/234.3, 236.5, 236.7

(56) References Cited

U.S. PATENT DOCUMENTS

| | | |
|---|---|---|
| 3,754,104 A | 8/1973 | Piper et al. |
| 4,034,412 A | 7/1977 | Smith |
| 4,327,387 A | 4/1982 | Plotto |
| 4,553,184 A | 11/1985 | Ogishima |
| 4,692,832 A | 9/1987 | Bandara et al. |
| 4,709,284 A | 11/1987 | Endo et al. |
| 4,757,402 A | 7/1988 | Mo |
| 4,802,042 A | 1/1989 | Strom |
| 4,853,810 A | 8/1989 | Pohl et al. |
| 4,893,204 A | 1/1990 | Yamada et al. |
| 4,901,185 A | 2/1990 | Kubo et al. |
| 5,010,429 A | 4/1991 | Taguchi et al. .......... 360/236.6 |
| 5,012,572 A | 5/1991 | Matsuzawa et al. |
| 5,020,213 A | 6/1991 | Aronoff et al. |
| 5,034,828 A | 7/1991 | Ananth et al. ........... 360/236.6 |
| 5,052,099 A | 10/1991 | Taguchi et al. .......... 29/603.12 |

(List continued on next page.)

FOREIGN PATENT DOCUMENTS

| | | | |
|---|---|---|---|
| EP | 0442 660 A2 | 2/1991 | .............. 360/236.6 |
| EP | 0731 453 A1 | 9/1996 | |
| JP | 54-23517 | 2/1979 | .............. 360/236.6 |
| JP | 56-107363 | 8/1981 | .............. 360/236.6 |
| JP | 59-193580 | 2/1984 | ................ 360/103 |
| JP | 4-245054 | 1/1992 | |
| JP | 8-069674 | 3/1996 | |
| JP | 8-212740 | 8/1996 | |
| JP | 8-279132 | 10/1996 | ................ 360/103 |
| JP | 8-287440 | 11/1996 | |

OTHER PUBLICATIONS

I. Etsion and L. Burstein, "A Model for Mechanical Seals with Regular Microsurface Structure," *Tribology Transactions*, vol. 39, (1996), pp 667–683.

Jing Gui et al., "A Stiction Model for a Head–Disk Interface of a Rigid Disk Drive," *J. Appl. Phys.*, vol. 78 (6), Sep. 15, 1995, pps 4206–4217.

G. Halperin et al., "Increasing Mechanical Seals Life with Laser–Textured Seal Faces," *Surface Surtech Technologis, Ltd.*, Sep. 1997, pp 1–12.

(List continued on next page.)

Primary Examiner—Daniel S. Larkin
(74) Attorney, Agent, or Firm—Westman, Champlin & Kelly, P.A.

(57) ABSTRACT

The present invention includes the realization that air bearing surface (ABS) microtexturing (i.e., the production of well-defined texture patterns on an ABS) affords an effective method to control the size of the apparent area of contact during head-to-disc frictional interaction, and thus provides a method to effectively prevent excessive friction force build-up which can lead to catastrophic tribological failure (head crash) during the glide characterization of super-smooth media for high areal density (for example greater than 20 Gb/in$^2$) head-to-disc interfaces (ADIs).

17 Claims, 15 Drawing Sheets

U.S. PATENT DOCUMENTS

| | | |
|---|---|---|
| 5,062,021 A | 10/1991 | Ranjan et al. |
| 5,063,712 A | 11/1991 | Hamilton et al. |
| 5,067,037 A | 11/1991 | Ananth et al. ............ 360/234.3 |
| 5,079,657 A | 1/1992 | Aronoff et al. .......... 360/236.6 |
| 5,162,073 A | 11/1992 | Aronoff et al. ............. 216/101 |
| 5,200,867 A | 4/1993 | Albrecht et al. ......... 360/246.2 |
| 5,202,803 A | 4/1993 | Albrecht et al. ......... 360/97.02 |
| 5,267,104 A | 11/1993 | Albrecht et al. ......... 360/97.02 |
| 5,285,337 A | 2/1994 | Best et al. ............... 360/97.02 |
| 5,323,282 A | 6/1994 | Kanai et al. ............. 360/235.3 |
| 5,345,353 A | 9/1994 | Krantz et al. |
| 5,374,463 A | 12/1994 | Bethune et al. |
| 5,386,666 A | 2/1995 | Cole |
| 5,388,020 A | 2/1995 | Nakamura et al. |
| 5,396,386 A | 3/1995 | Bolasna et al. |
| 5,396,387 A | 3/1995 | Murray |
| 5,418,667 A | 5/1995 | Best et al. |
| 5,420,735 A | 5/1995 | Haines |
| 5,424,888 A | 6/1995 | Hendriks et al. |
| 5,446,606 A | 8/1995 | Brunner et al. |
| 5,453,315 A | 9/1995 | Hamilton et al. |
| 5,482,497 A | 1/1996 | Gonnella et al. |
| 5,490,027 A | 2/1996 | Hamilton et al. |
| 5,499,149 A | 3/1996 | Dovek |
| 5,499,731 A | 3/1996 | Marshall |
| 5,508,077 A | 4/1996 | Chen et al. |
| 5,508,861 A | 4/1996 | Ananth et al. ........... 360/235.4 |
| 5,515,219 A | 5/1996 | Ihrke et al. |
| 5,526,204 A | 6/1996 | French et al. |
| 5,537,273 A | 7/1996 | Hendriks et al. |
| 5,550,691 A | 8/1996 | Hamilton |
| 5,550,693 A | 8/1996 | Hendriks et al. |
| 5,550,696 A | 8/1996 | Nguyen |
| 5,557,488 A | 9/1996 | Hamilton et al. |
| 5,569,506 A | 10/1996 | Jahnes et al. |
| 5,572,386 A | 11/1996 | Ananth et al. |
| 5,586,040 A | 12/1996 | Baumgart et al. |
| 5,606,476 A | 2/1997 | Chang et al. |
| 5,609,657 A | 3/1997 | Ishitobi |
| 5,612,838 A | 3/1997 | Smith et al. |
| 5,620,574 A | 4/1997 | Teng et al. |
| 5,625,512 A | 4/1997 | Smith ..................... 360/236.6 |
| 5,626,941 A | 5/1997 | Ouano |
| 5,635,269 A | 6/1997 | Weir et al. |
| 5,721,033 A | 2/1998 | Teng et al. |
| 5,726,831 A | 3/1998 | White |
| 5,742,518 A | 4/1998 | Gui et al. |
| 5,768,055 A | 6/1998 | Tian et al. ............... 360/235.2 |
| 5,774,303 A | 6/1998 | Teng et al. .............. 360/235.2 |
| 5,796,551 A | 8/1998 | Samuelson ............... 360/236.8 |
| 5,815,346 A | 9/1998 | Kimmal et al. |
| 5,817,931 A | 10/1998 | Boutaghou ................... 73/105 |
| 5,822,153 A | 10/1998 | Lairson et al. |
| 5,841,608 A | 11/1998 | Kasamatsu et al. ...... 360/236.6 |
| 5,862,013 A | 1/1999 | Haga |
| 5,864,452 A | 1/1999 | Hirano et al. |
| 5,870,250 A | 2/1999 | Bolasna et al. |
| 5,870,251 A | 2/1999 | Boutaghou |
| 5,872,686 A | 2/1999 | Dorius et al. |
| 5,886,856 A | 3/1999 | Tokuyama et al. ........ 360/234.7 |
| 5,912,791 A | 6/1999 | Sundaram et al. .......... 360/135 |
| 5,991,118 A | 11/1999 | Kasamatsu et al. ...... 360/236.6 |
| 5,994,035 A | 11/1999 | Tsukamoto et al. |
| 6,003,364 A | 12/1999 | Yao et al. ..................... 73/105 |
| 6,021,032 A | 2/2000 | Xuan |
| 6,040,958 A | 3/2000 | Yamamoto et al. ...... 360/236.3 |
| 6,073,337 A | 6/2000 | Strom |

OTHER PUBLICATIONS

"Magnetic Disk Storage System with Structured Magnetic Head Slider," *IBM Technical Disclosure Bulletin*, vol. 27, No. 10 (A), Mar. 1985, pp 3–4.

Y. Kasamatsu et al., "Stiction Free Slider for the Smooth Surface Disk," *IEEE Transactions on Magnetics*, vol. 31, No. 6, Nov. 1995, pp 2961–2963.

D.S. Hobbs et al. "Automated Interference Lithography Systems for Generation of Sub–Micron Feature Size Patterns," Proceedings of SPIE, vol. 3879, Sep. 20–21, 1999, pp 124–135.

Yong Hu and David B. Bogy, "Effects of Laser Textured Disk Surfaces on a Slider's Flying Characteristics," *American Society of Mechanical Engineers*, Sep. 1997.

MICRO-TEXTURED GLIDE SLIDERS FOR SUPER-SMOOTH MEDIA

CROSS-REFERENCE TO RELATED APPLICATION

This application claims priority from U.S. Provisional Application No. 60/168,850, filed Dec. 2, 1999, and entitled "MICRO-TEXURED GLIDE SLIDERS FOR SUPER-SMOOTH MEDIA."

BACKGROUND OF THE INVENTION

The present invention relates to glide heads for evaluating the glide quality of a disc surface, and to related methods. More particularly, the invention relates to glide heads that detect collisions of the slider with a defect on a disc surface.

Disc drives are used for storing information, typically as magnetically encoded data, and more recently as optically encoded data, on a disc surface. Glide tests are used to check disc surfaces for defects. Glide tests allow computer disc manufacturers to control and assure the quality of the disc media. Generally, all hard drive discs are tested before shipment. During a glide test, the glide head or slider flies over a disc surface generally at a predetermined clearance from the disc surface, known as the glide height or fly height.

If contact occurs between the glide head and a disc defect or asperity, the glide head detects the contact using various known methods such as vibration or thermal energy detection. The vibrations can be measured with a piezoelectric transducer (PZT), which generates a potential difference between the electrodes of the PZT due to deformation of the transducer. Specifically, when the glide head interacts with a defect on the spinning disc, simultaneously excited vibrational modes of the PZT and the head result in voltages at corresponding frequencies. If the magnitude of measured voltages exceed predetermined threshold values, the disc may be rejected. Contact can also be detected using a magneto-resistive or other sensor which exhibits a change in operation in the presence of thermal energy generated as a result of the contact.

An important requirement upon which the realization of high data recording densities (20 $Gb/in^2$ and beyond) in hard-disc-drive-based data storage systems is the ability to maintain very low head-to-disc separations (i.e., flying eights), for example of 0.5 $\mu$in or lower. This inherent requirement has lead to the development of media with ultra low glide heights or, equivalently super-smooth surface finishes with center line average roughness (Ra) in the range of 0.2–0.6 nm.

The glide tests (also called characterization or certification) of media involves the determination, using a "glide head", of the flying height at which head-to-disc contact is first detected. Such flying height is regarded as the media glide height. Typically, head-to-disc contact is induced using "spin-down", or "rotation per minute" (RPM) drop, as a glide head flies over the media surface to be characterized/certified. Knowledge of the variation of the fly height with RPM for the glide head allows the determination of the glide height.

A glide characterization/certification of super-smooth media using conventional glide heads having smooth air bearing surfaces presents a serious risk In effect, when the two smooth surfaces in relative motion are brought into contact, a large number of contact junctions are formed at the contact interface, resulting in a large real area of contact between the glide head and the media. Under such conditions, the friction force resisting the relative sliding motion between the contacting surfaces is proportional to the large number of contact junctions that must be sheared off if relative motion is to occur. Thus, the contact of a conventional glide head and a super-smooth disc surface can be expected to be accompanied by a large friction force built-up, which can lead to slider forward pitching, air-bearing destabilization, and ultimately, a head crash. This situation effectively limits the usefulness of conventional glide heads for the glide characterization/certification of super-smooth media. Consequently, a new approach of characterizing/certifying super-smooth media is needed.

SUMMARY OF THE INVENTION

The present invention includes the realization that air bearing surface (ABS) microtextung (i.e., the production of well-defined texture patterns on an ABS) affords an effective method to control the size of the apparent area of contact during head-to-disc frictional interaction, and thus provides a method to effectively prevent excessive friction force build-up which can lead to catastrophic tribological failure (head crash) during the glide characterization of super-smooth media for high areal density (for example greater than 20 $Gb/in^2$) head-to-disc interfaces (ADIs).

DETAILED DESCRIPTION OF ILLUSTRATIVE EMBODIMENTS

Figure 1:
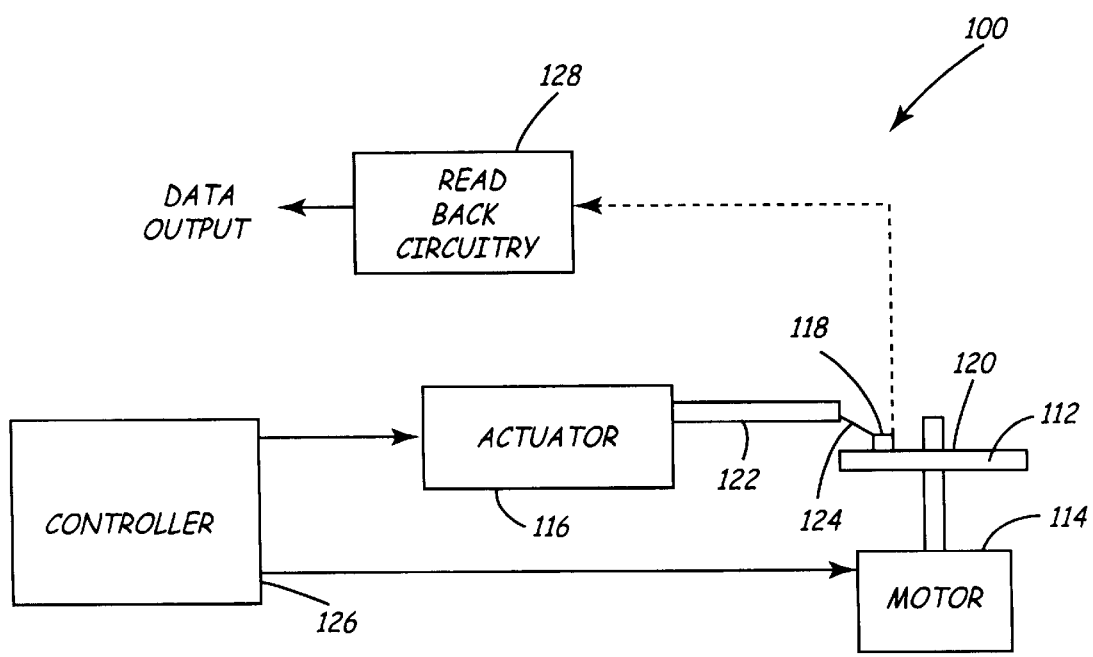
FIG. 1 is a schematic representation of a disc drive.

FIG. 1 shows a schematic representation of a disc drive glide characterization/certification system 100 in accordance with the present invention. System 100 includes storage medium 112, such as a magnetic disc, which is rotated by motor 114. An actuator 116 is coupled to glide head 118 which is used for characterization of a surface 120 of disc 112. Actuator 116 includes actuator arm 122, which is attached to glide head 118 via suspension 124. A controller 126 controls positioning of glide head 118. Sensors (not shown) coupled to glide head 118 detect contact of the glide head 118 with the surface 120. Sensors can be comprised of piezoelectric transducers (PZT) or any similar mechanism to provide data output responsive to the contact detected. Upon detected contact, sensors provide output data to read back circuitry 128.

Figure 2B:
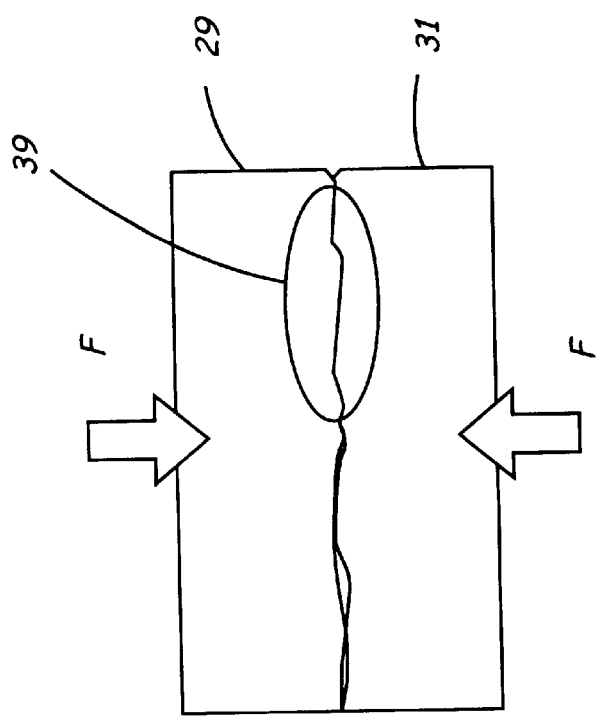
FIGS. 2A and 2B are schematic representations of the contact between rough surfaces and smooth surfaces, respectively.
Figure 2A:
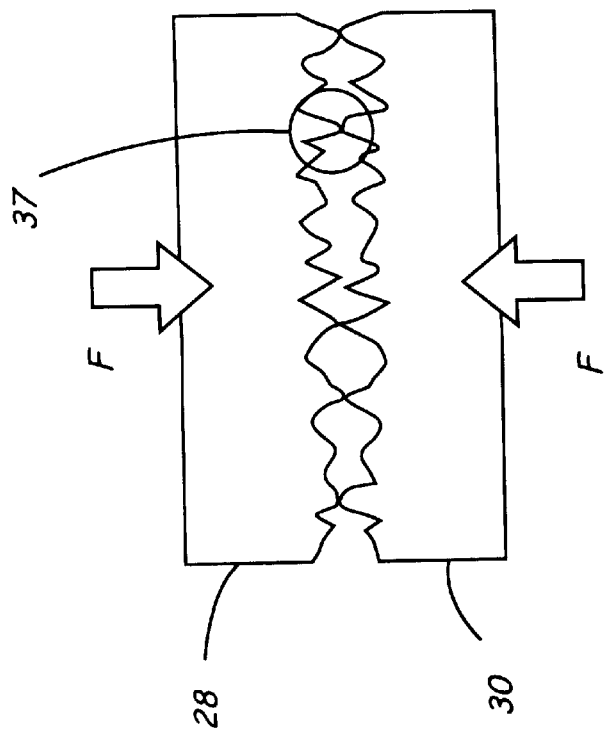

FIGS. 2A and 2B are schematic representations of the contact between rough surfaces and smooth surfaces, respectively. As illustrated in FIG. 2A, when rough surfaces 28 and 30 in relative motion are brought into contact, a small number of contact junctions are formed at the contact interface resulting in a small area of contact (for example contact area 37). Under these conditions, the force resisting the relative motion between rough surfaces 28 and 30 (i.e., the friction force), would be proportional to the small number of contact junctions.

FIG. 2B shows smooth surfaces 29 and 31 brought into contact in relative motion. A large number of contact junctions are formed at the contact interface resulting in a large area of contact (for example contact area 39). Under such conditions, the force resisting the relative sliding motion between the contact surfaces (i.e., the friction force), would be proportional to the large number of contact junctions. Thus, in system 100, the contact of a conventional glide head and a super-smooth disc surface can be expected to be accompanied by a large friction force build-up, which can lead to slider forward-pitching, air-bearing destabilization, and ultimately a head crash.

Figure 3A:
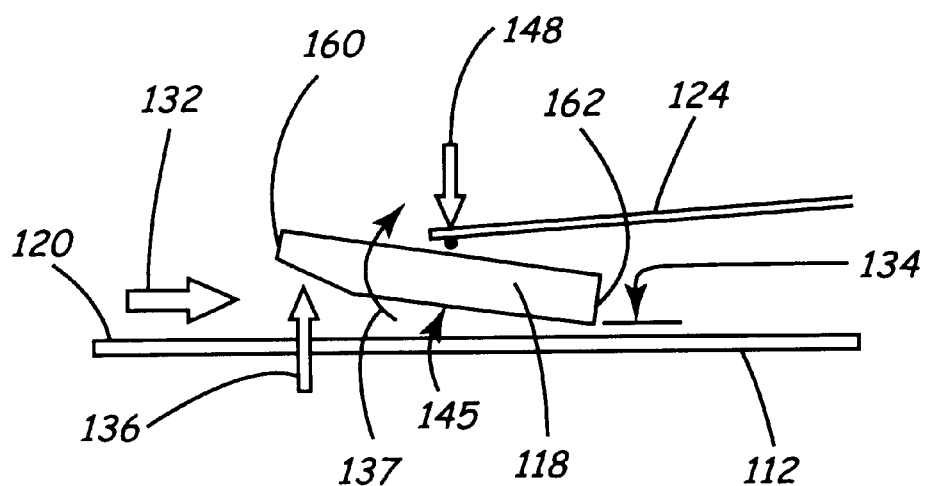
FIG. 3A is a schematic representation of a glide head in the fly regime.

FIG. 3A is a schematic representation of a glide head in the fly operating regime during characterization of a super-smooth disc surface. Glide head 118 flies over disc surface 120 at fly height 134 with preload force 148 applied in part from suspension 124. Fly height 134 is measured by the distance from the disc surface 120 to a lower edge of glide head 118. Air flow 132 provides an air bearing lift force 136 on air bearing surface 145 that produces an air bearing lift force pitch moment 137 to tilt the glide head 118 at the desired fly height 134.

Figure 3B:
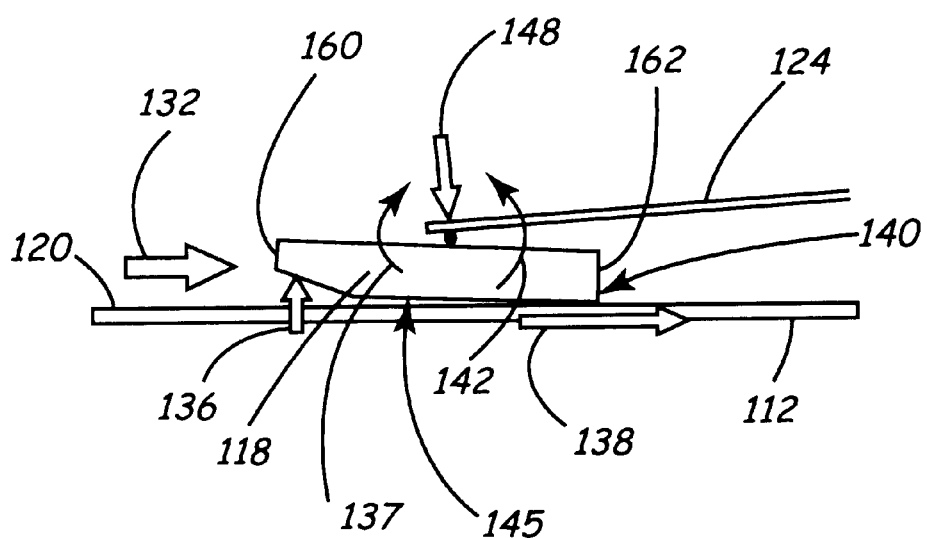
FIG. 3B is a schematic representation of friction-induced glide head forward-pitching in the contact regime.

FIG. 3B is a schematic representation of friction-induced glide head forward-pitching in the contact operating regime during characterization of a super-smooth disc surface. As illustrated, glide head 118 has come into contact with disc surface 120 at contact region 140. The contact may be a result of a defect or asperity on the disc surface 120 or result from torsion or roll of the glide head 118. At the contact region 140, a friction force 138 exists between the glide head 118 and disc surface 120 producing a friction induced moment 142. Forward-pitching has occurred in which leading edge 160 is forced downward due to a situation where friction induced moment 142 is greater than air bearing pitch moment 137. The forward-pitching can lead to unwanted conditions such as significant wear of the glide head or even a head crash.

Figure 4A:
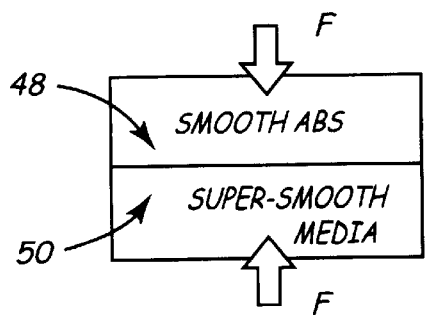
FIG. 4A is a schematic representation of contact between a conventional or smooth ABS and a super-smooth media.

FIG. 4A is a schematic representation of contact between a smooth ABS 48 and a super smooth media 50. When smooth ABS 48 and super-smooth media 50 in relative motion are brought into contact, a large area of contact occurs producing a large friction build-up. The friction build-up is not desirable and provides considerable wear to the smooth ABS 48.

Figure 4B:
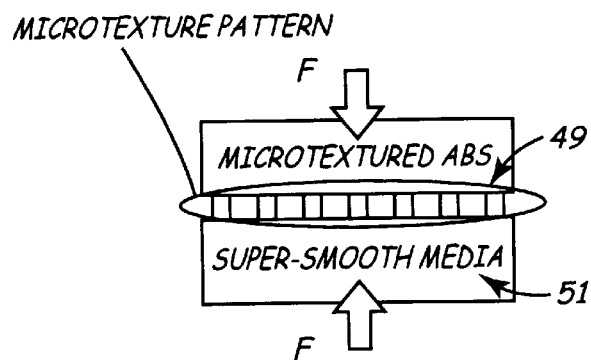
FIG. 4B is a schematic representation of a contact between a microtextured ABS and super-smooth media.

FIG. 4B is a schematic representation of contact between a micro-textured ABS 49 and a super-smooth media 51. A micro-textured pattern has been disposed on the ABS 49 to contact with the super-smooth media 51. When micro-textured ABS 49 and super-smooth media in relative motion are brought into contact, there is a reduced area of contact that results in reduced friction build up. The wear rate for a micro-textured ABS 49 is considerably lower than for a smooth ABS, as shown in FIG. 4A.

Figure 5:
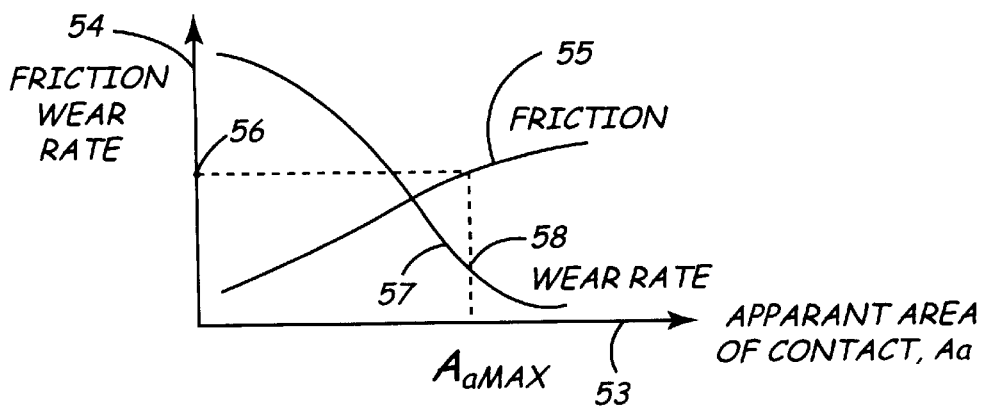
FIG. 5 is a schematic representation of friction and wear trends for microtextured patterns.

FIG. 5 is a schematic representation of friction and wear rate trends for a glide head having a micro-textured ABS. As the apparent area of contact between the glide head and a super-smooth media surface increases (axis 53), the magnitude of the contact stresses experienced by the topographical features making up the micro-texture pattern decreases. The latter results in reduced glide head wear rates (axis 54). Increasing apparent areas of contact lead, however, to rising friction force build-ups. From a micro-textured glide head design point of view, an optimum apparent area of contact is that for which a suitable compromise between friction 55 and wear performance (wear rate 57) can be attained. Namely, wear rate 57 should be kept as low as possible while maintaining friction 55 within acceptable/tolerable levels. A lower wear rate is desirable from the standpoint of glide head durability. Friction 55 should be kept below maximum sustainable friction value 56 to avoid a head crash, while wear rate 57 should be kept at low levels to maximize glide head durability. Thus, if friction 55 is maintained at or below maximum sustainable friction value 56, the wear rate 57 can be kept at or near a desirable wear rate, such as value 58.

Figure 6A:
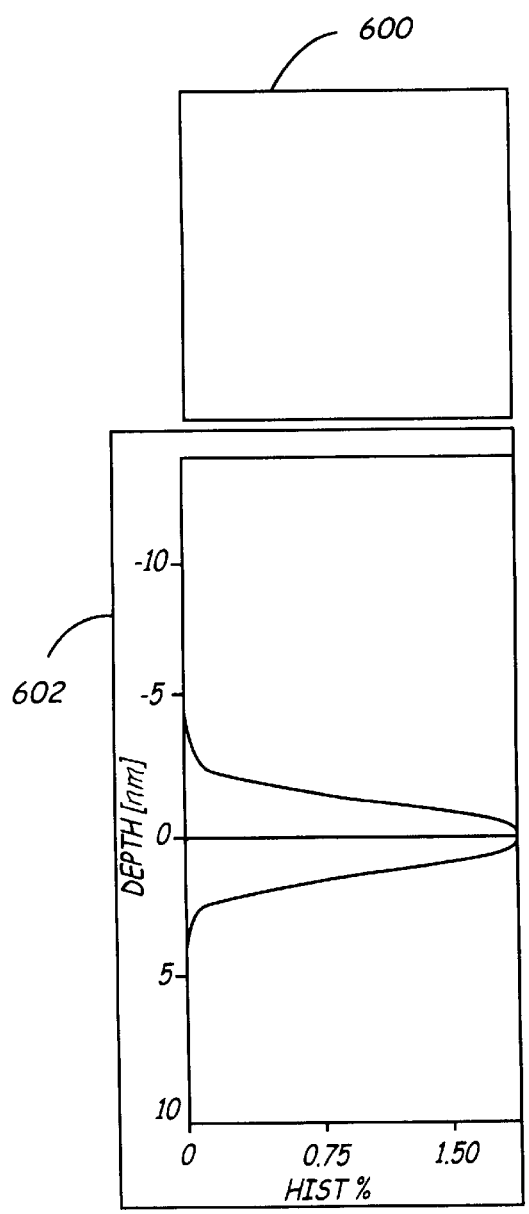
FIGS. 6A and 6B are atomic force microscope (AFM) scans and height distribution histograms for an untextured ABS and for a microtextured ABS, respectively.

FIG. 6A is an atomic force microscope (AFM) scan and height distribution histogram for an untextured ABS 600. Histogram 602 illustrates a normal or Gausian distribution of irregularities on the untextured ABS 600. Dimensions (heights, length, width, etc.) of the irregularities are less than 5 nm which characterize a smooth ABS.

Figure 6B:
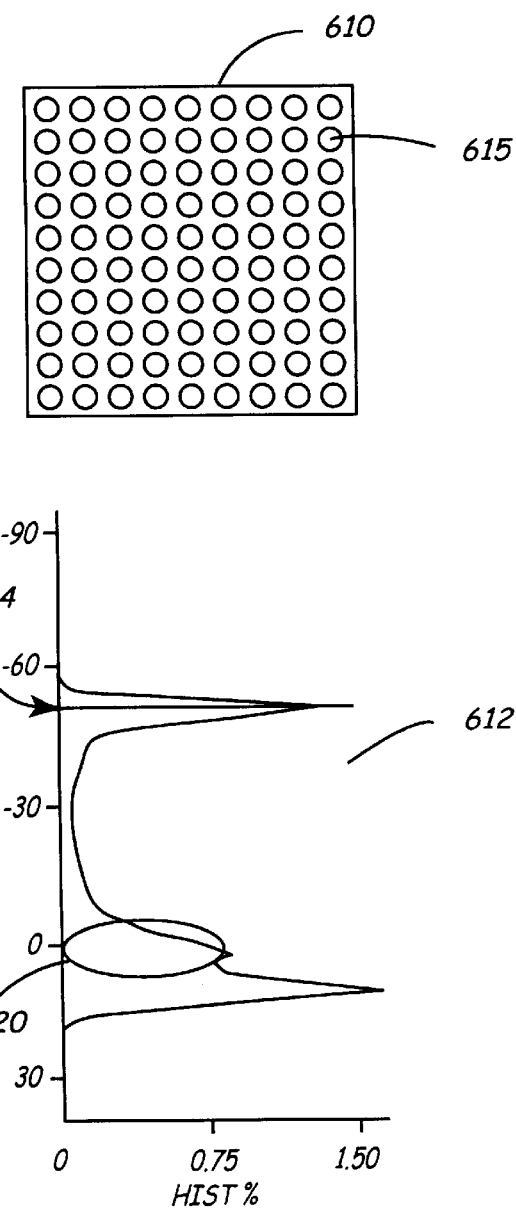

Referring now to FIG. 6B, an AFM of micro-textured ABS 610 is shown with a deterministic micro-textured pattern. Deterministic micro-textured patterns can be produced by means of either conventional photolithography or interference lithography. Sub-micron or nanometer (nm) level 1 structures 615 can be effectively generated using interference lithography. An interference lithography system such as the HLS Model PC2, manufactured by Holographic Lithography Systems of Bedford, Mass., can be used. As known by those skilled in the art, interference lithography is also referred to as holographic lithography. Interference lithography can produce a deterministic micro-textured pattern comprised of a plurality of characteristic features 615 with a size (typically a diameter, width, etc.) of less than one micron. Characteristic features 615 are structures that can be a variety of different shapes including cylinders, boxes, bumps, squares, rectangles, ellipses, peaks and valleys, or a number of other shapes. Deterministic patterns (i.e., a well defined sequence of structures) of the characteristic features provide a glide head with a contact surface that prevents excessive friction build-up and reduces the glide head wear rate. Micro-textured ABS 610 has a deterministic microtextured pattern of characteristic features 615 shown by way of example. In this embodiment, characteristic features 615 are cylinders and each characteristic features are arranged in columns and rows.

Histogram 612 shows a bimodal distribution of the characteristic feature heights and depths of the micro-textured ABS 610. Region 620 illustrates a mean depth of the micro-textured pattern which is proximate a reference position of zero. Region 624 illustrates mean characteristic feature heights of the micro-textured pattern around 50 nm.

The present invention includes the micro-texturing of ABS/glide head "close-point" locations as well as the use of micro-textured displaced contact features ("contact pads" i.e., dedicated contact features that protrude from the ABS). The term ABS "close points" refers to the region(s) of the ABS that will, or are most likely to, come into contact with the disc during glide testing and which are prescribed by design and/or can be found experimentally.

Figure 7A:
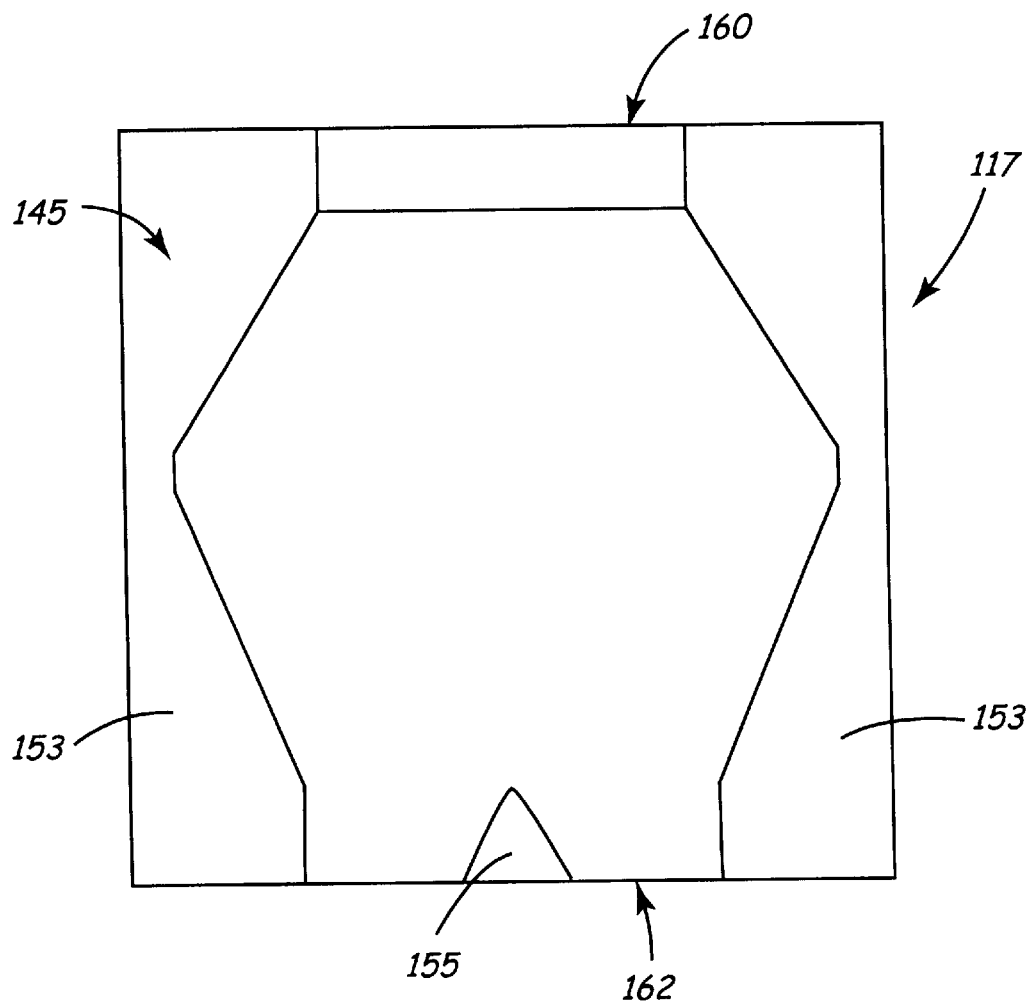
FIG. 7A illustrates a bottom view of a glide head of a standard (untextured) ABS.

FIG. 7A illustrates a bottom view of an exemplary prior art glide head with an untextured ABS. Glide head 117 is comprised of leading edge 160, trailing edge 162, and ABS 145. Side rails 153 and center rail 155 are disposed on and form portions of the ABS 145. Side rails 153 and center rail 155 can be a variety of different shapes and sizes in order to form ABS 145.

Figure 7B:
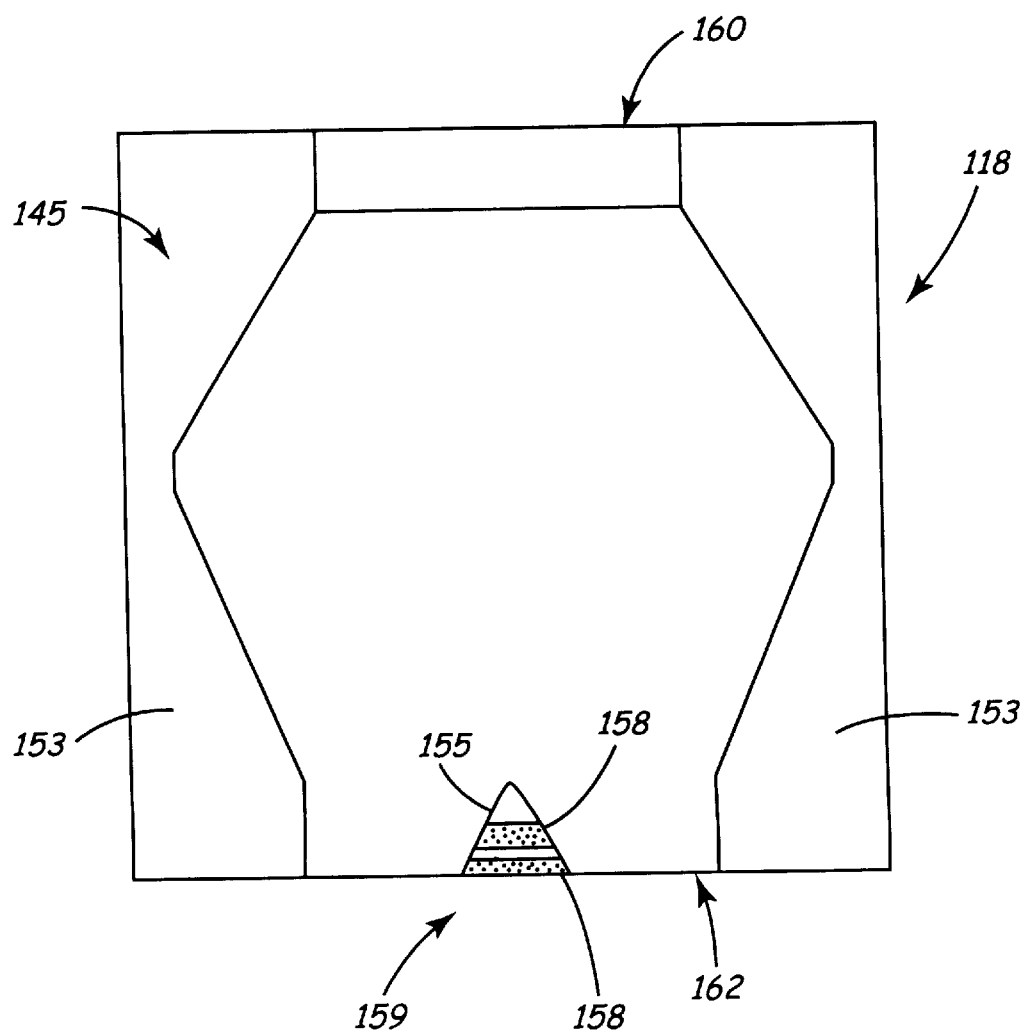
FIGS. 7B–7E illustrate A bottom view of alternative embodiments of glide heads with micro-textured ABS.

FIG. 7B illustrates a bottom view of an exemplary glide head 118 with a micro-textured ABS. Glide head 118 is similar to glide head 117, with similar reference numerals corresponding to numerals described in FIG. 7A. FIG. 7B also illustrates contact pad 159 comprised of micro-textured contact regions 158. The micro-textured contact regions 158 are deterministic patterns formed of characteristic features having dimensions of less than about 1 micron disposed on center rail 155 of the glide head 118. Micro-textured contact regions 158 can be placed at different portions on ABS 145 in order to contact a disc surface to reduce wear on glide head 118. Contact pad 159 can be a variety of different shapes and sizes disposed on the ABS 145.

Figure 7C:
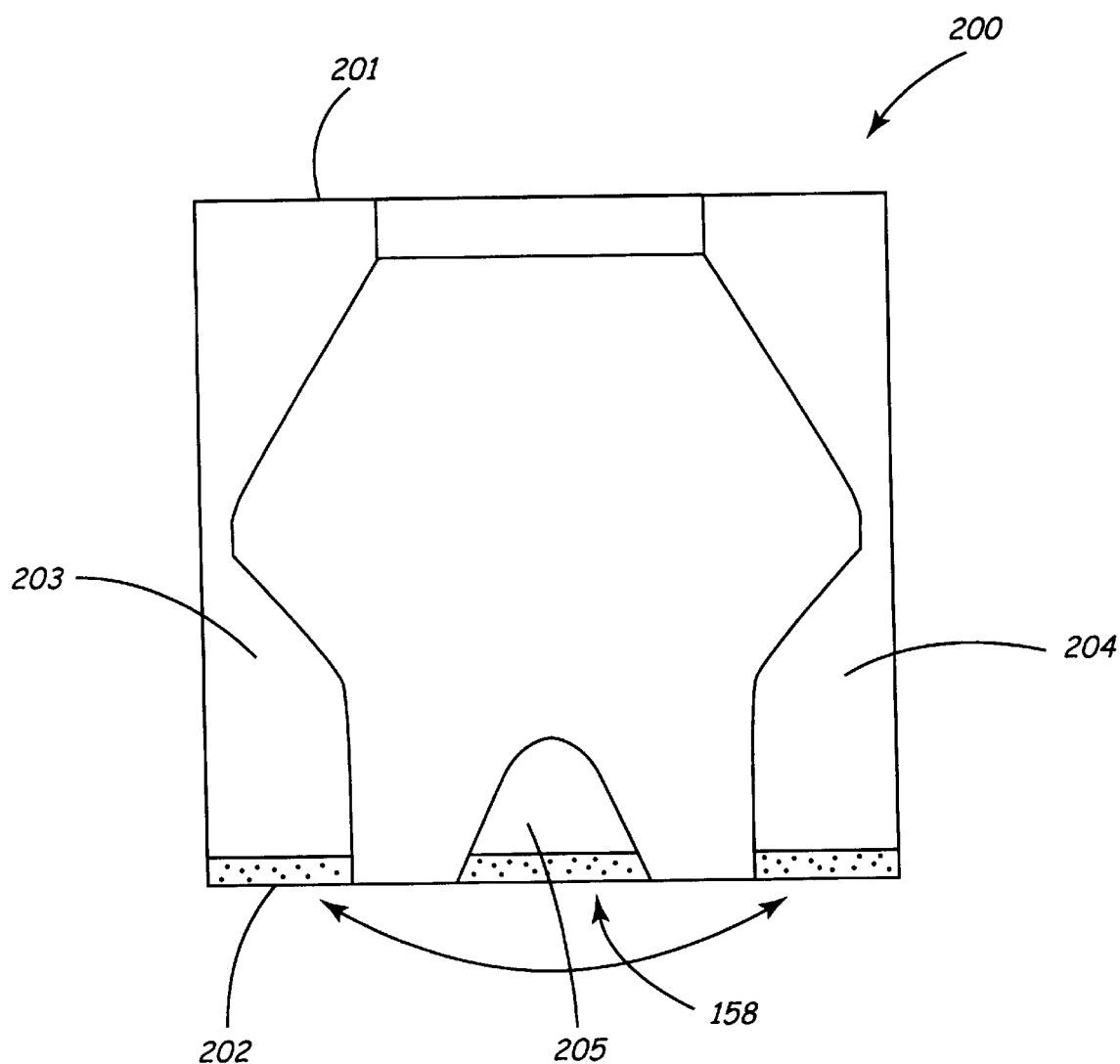

For an air bearing (AB) design such as the one depicted in FIGS. 7A–7B, with side rails extending all the way to the trailing edge (TE) of the slider, an additional micro-textured glide head configuration can be found in FIG. 7C. The slider shown in FIG. 7C has no micro-textured contact pad(s) on it. Instead, a micro-texture pattern is produced on the regions of the ABS likely to come into contact with the media (i.e., the TE portions of the center and side rails).

FIG. 7C illustrates a bottom view of alternative glide head 200 with a micro-textured ABS. Glide 200 includes leading edge 201, trailing edge 202, side rails 203 and 204, and center rail 205. Micro-textured contact regions 158 are disposed directly on trailing edge ends of side rails 203 and 204 and center rail 205. The contact regions are disposed at "close point" locations, which refer to the regions of the air bearing surface that will, or are most likely to, come into contact with a disc during glide testing. Close points can be found experimentally or can be prescribed by design.

Figure 7D:
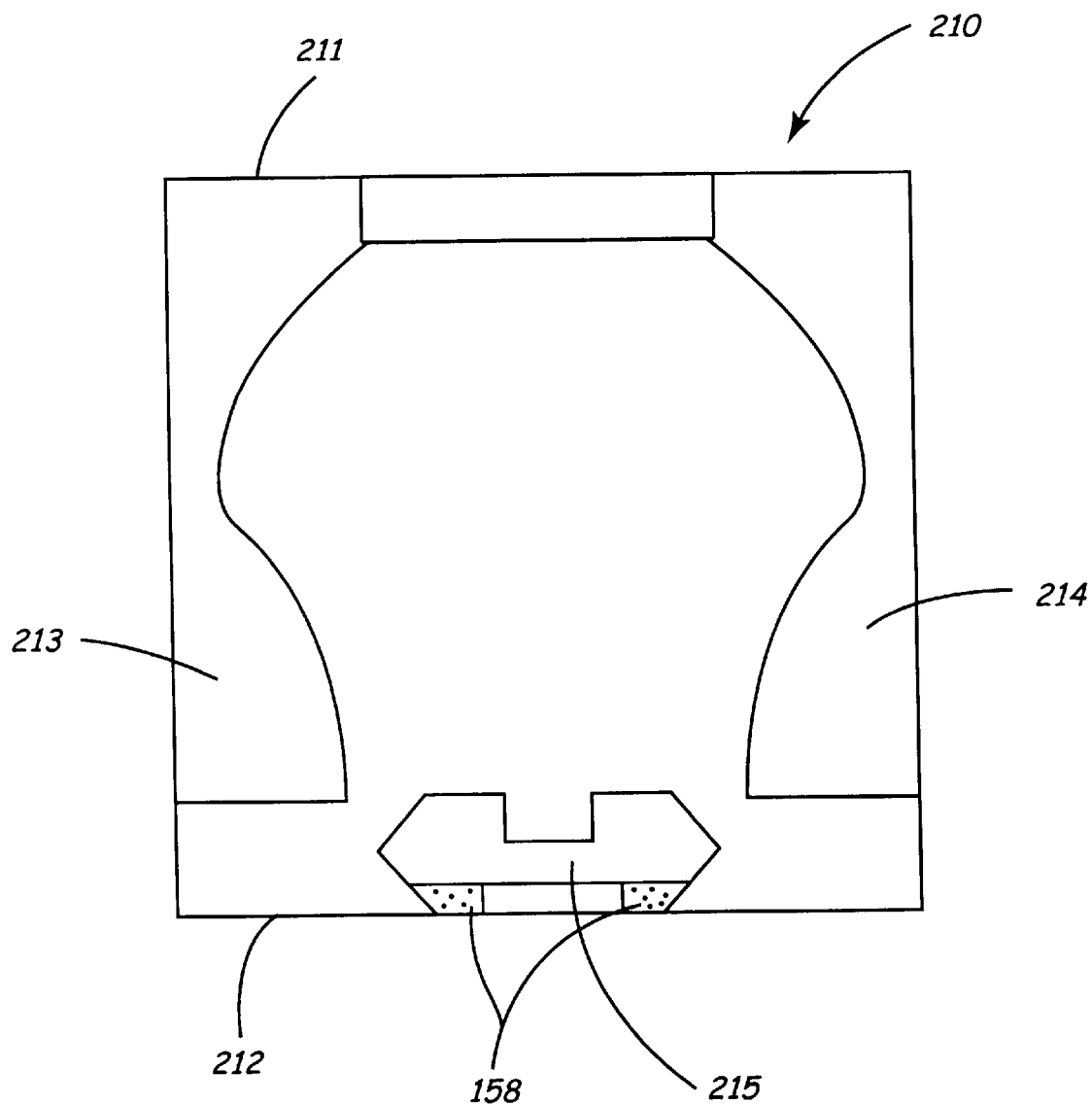

FIG. 7D shows an alternative embodiment of the present invention. Glide head 210 includes leading edge 211, trailing edge 212, side rails 213 and 214 and center rail 215. With glide head 210, side rails 213 and 214 do not extend to the trailing edge 212 of glide head 210, and thus, the ABS close point locations are on the center rail 215. Center rail 215 can have any of a wide range of different shapes and configurations. Micro-textured contact regions 158 are disposed on the center rail at the close point locations in order to prevent excessive friction build-up between glide head 210 and a disc surface.

Figure 7E:
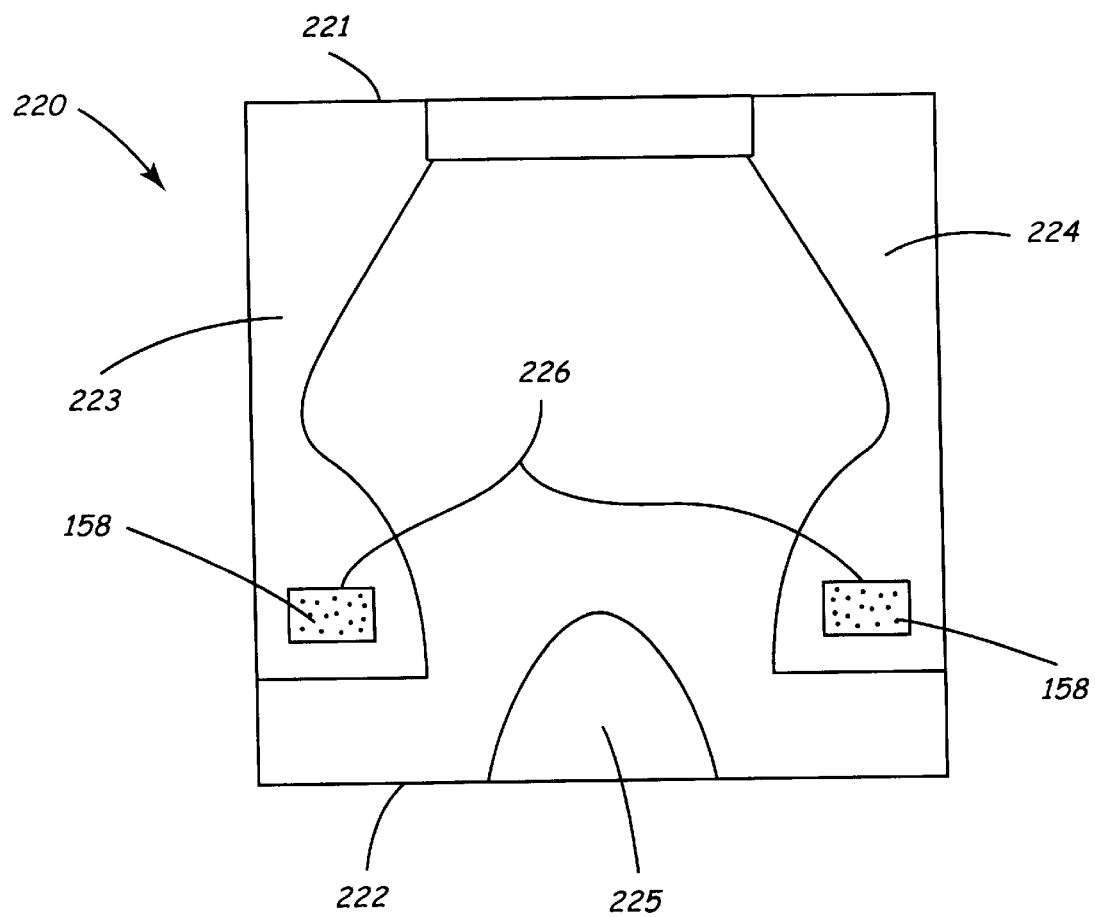

FIG. 7E illustrates another alternative embodiment of a micro-textured glide head. Glide head 220 includes leading edge 221, trailing edge 222, side rails 223 and 224, and center rail 225. In this embodiment, contact pads 226 are disposed on side rails 223 and 224. Contact pads 226 have micro-textured regions 158 which are adapted to come into contact with a disc surface. Contact pads 226 can be made out of a friction friendly material, such as diamond-like carbon DLC). Those skilled in the art will recognize that contact pads 226 can also have different cross sectional shapes, such as a circular, elliptical, or rectangular shapes. Other shapes and sizes of contact pads can similarly be disposed on a glide head according to the present invention.

Figure 8A:
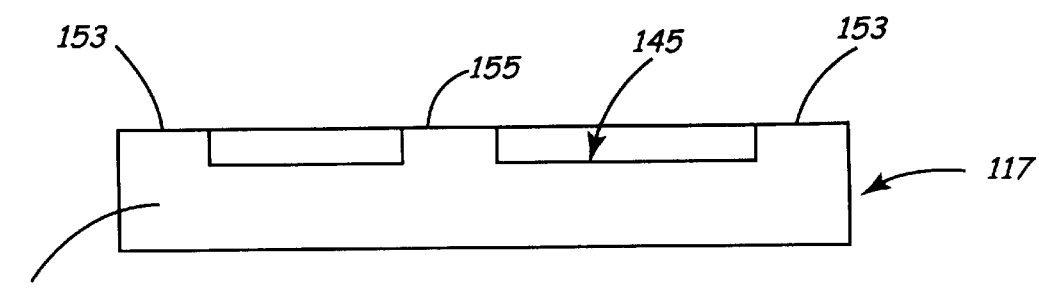
FIGS. 8A and 8E illustrate a rear view of the glide head in FIGS. 7A and 7E, respectively.

FIG. 8A shows a rear view of the glide head illustrated in FIG. 7A. Side rails 153 and center rail 155 provide smooth surfaces that are raised and will come into contact with a disc surface during characterization of the disc surface. Excessive friction can build up due to the smooth surfaces of side rails 153 and center rail 155 coming into contact with a super-smooth disc surface.

Figure 8B:
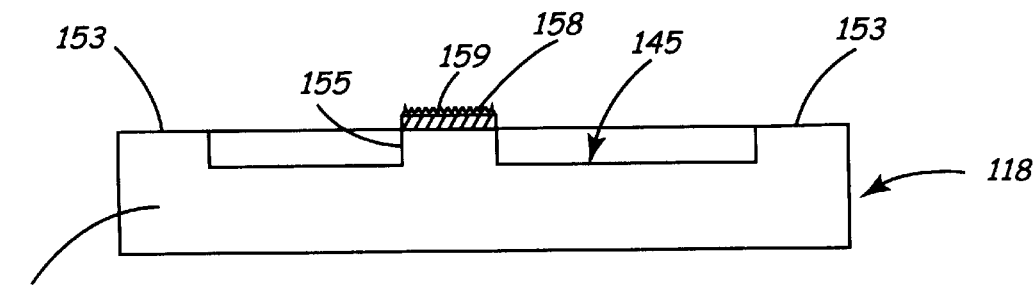

FIG. 8B shows a rear view of the slider shown in FIG. 7B. Contact pad 159 is more clearly shown. Contact pad 159 has micro-textured contact regions 158 and is disposed on top of center rail 155. In this embodiment, contact pad 159 is responsible for contacting a super-smooth media during characterization in order to reduce wear of glide head 118. As discussed above, micro-textured contact regions 158 include deterministic patterns of characteristic features having widths of less than about 1 micron.

Figure 8C:
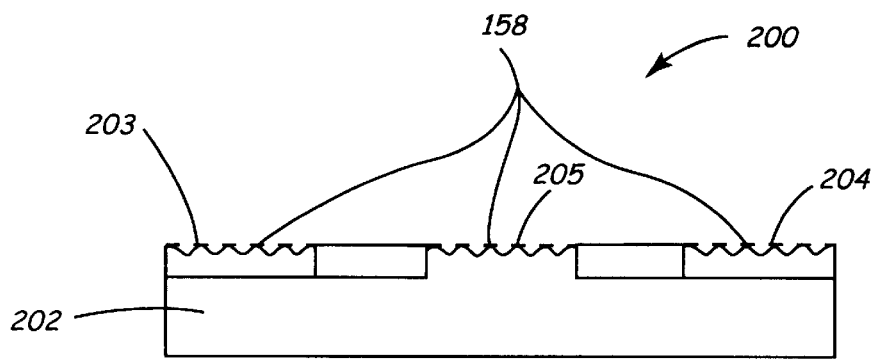

FIG. 8C illustrates a rear view of slider 200, as shown in FIG. 7C. In this embodiment, micro-textured contact regions 158 are disposed directly on side rails 203 and 204 and center rail 205. The micro-textured contact regions 158 are located on the trailing edge side of rails 203, 204, and 205.

Figure 8D:
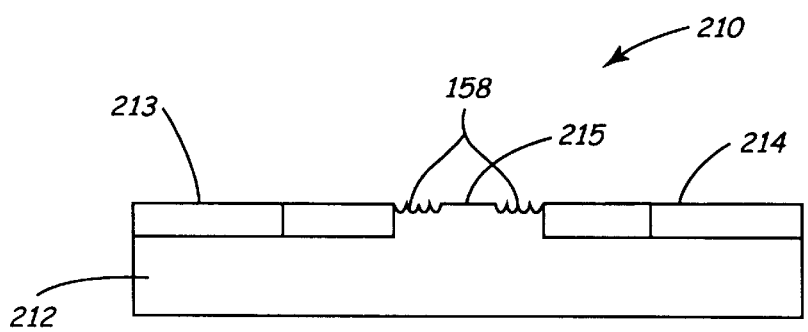

FIG. 8D shows a rear view of slider 210. Since rails 213 and 214 do not extend to trailing edge 212, micro-textured regions 158 are disposed directly on center rail 215. Like the slider in FIG. 8C, no contact pad is used in this embodiment.

Figure 8E:
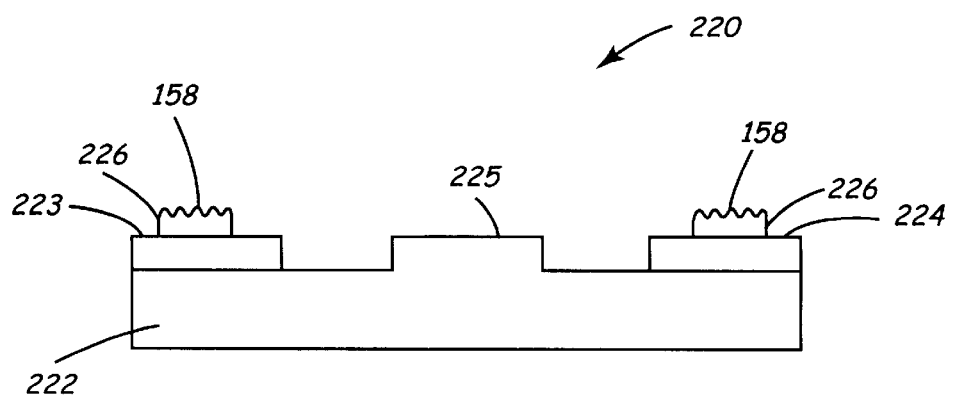

FIG. 8E shows a rear view of slider 220, as illustrated in FIG. 7E. As can be seen in FIG. 8E, contact pads 226 are disposed on side rails 223 and 224. Micro-textured contact regions 158 are disposed on contact pads 226 in order to contact with a disc surface during characterization.

Figure 9A:
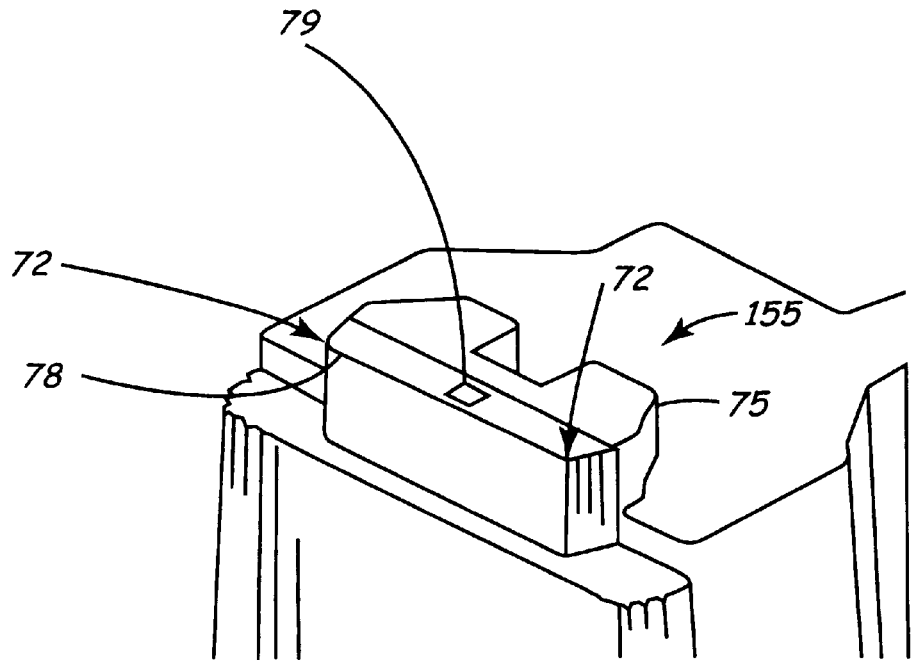
FIGS. 9A and 9B illustrate a portion of center rail of a standard (untextured) prior art ABS and a portion of a center rail of a microtextured ABS, respectively.

FIG. 9A illustrates a center rail of a prior art (untextured) ABS, as illustrated in FIG. 7A. Center rail 155 is comprised of front portion 75 and trailing end portion 78. In addition, center rail 155 includes sensor 79 and close points 72. Sensor 79 detects asperities on a disc surface during characterization of a super-smooth media. Close points 72 are the points of the glide head that are likely to come into contact with a surface of the super-smooth media during torsion or roll of the glide head. Trailing end portion 78 can be comprised of alumina oxide ($Al_2O_3$) or any similar material.

Figure 9B:
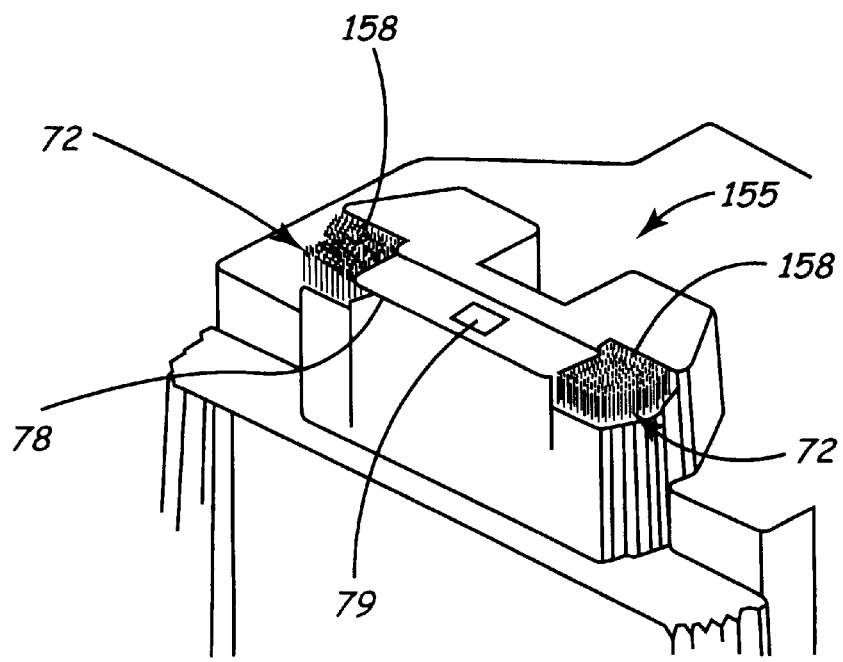

FIG. 9B illustrates a portion of the center rail of a micro-textured ABS, as illustrated in FIG. 7D. Center rail 155 includes micro-textured portions 158 disposed at close points 72. Micro-textured portions 158 form contact regions. In addition, center rail 155 can optionally include sensor 79 in some embodiments. Trailing end portion 78 can be made of alumina oxide ($Al_2O_3$) or any similar material. In one embodiment, micro-textured contact regions 158 can extend from center rail 155 beyond close points 72 in order to further protect the glide head. As the glide head characterizes a super-smooth media surface, contact regions 158 come into contact with the media surface and consequently excessive friction build-up is averted and, at the same time, wear of the glide head is reduced.

Figure 10A:
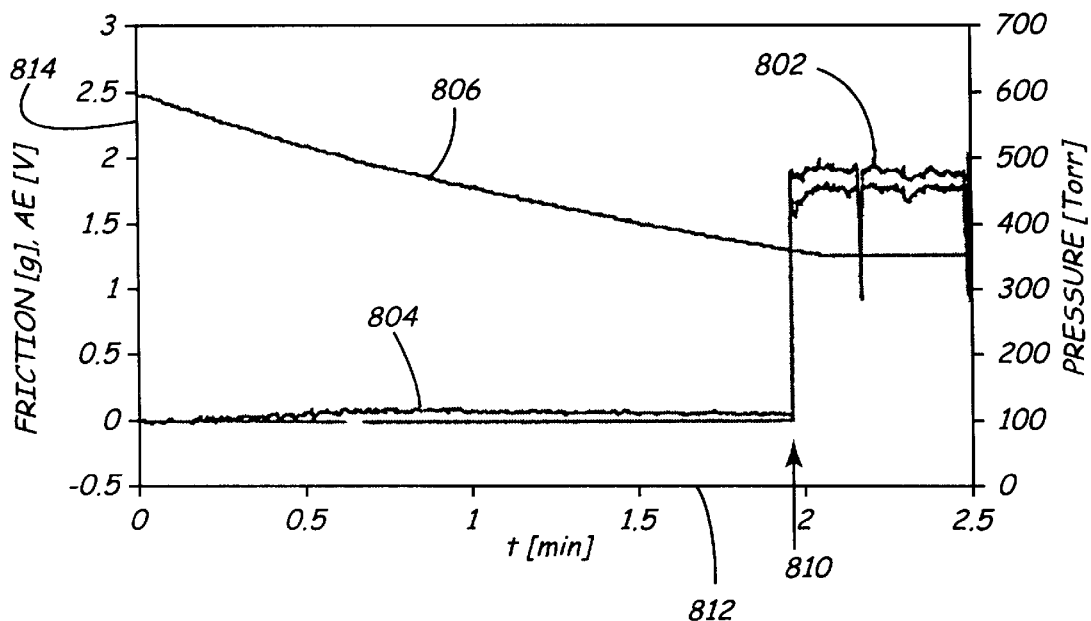
FIGS. 10A and 10B are plots showing ATD data for a standard (untextured) glide head and for a microtextured glide head on super-smooth media, respectively.
Figure 10B:
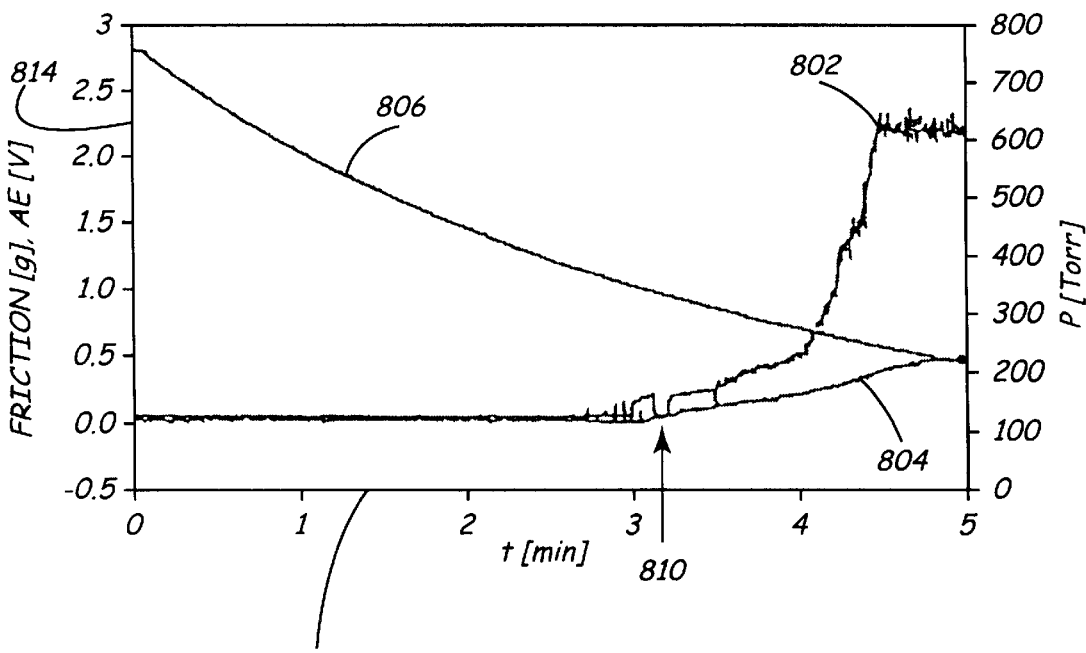

FIGS. 10A and 10B are plots showing altitude touch down (ATD) data for a standard (untextured) ABS and for a micro-textured ABS on super-smooth media, respectively. In an ATD test, flying height is progressively reduced via air rarefaction, which is achieved by means of ambient pressure drops while a glide head flies over a disc at nominal operating speed. Continuous, real time monitoring of friction force and acoustic emissions (AE) during an ATD test allow for the detection of contact between the glide head and the disc, or alternatively head-disc contact. Generally, head-disc contact (i.e., the transition from the "fly" to the "contact" operating regime) is accompanied by sharp increases in both friction force and AE.

As shown in FIG. 10A, pressure 806 is reduced over time which is represented by axis 812. As pressure 806 drops, fly height decreases and the glide head eventually comes into contact with the disc represented by arrow 810. At this point, acoustic emissions 802 and friction force 804 increase sharply along axis 814 since the glide head and the disc have smooth surfaces. The high friction force leads to unwanted wear of the glide head, forward-pitching, air bearing destablitation and head crashes.

FIG. 10B shows ATD data for a micro-textured glide head on super-smooth media. Again, pressure 806 is reduced over time as represented by axis 812. Arrow 810 represents the point at which the glide head and the disc come into contact with each other. With the micro-textured glide head, friction 804 is maintained at a relatively low value along axis 814 even though the acoustic emissions 802 increase sharply with the contact (represented by arrow 810) of the glide head and the disc. Thus, this plot shows the effectiveness of micro-texturing an ABS as a means to mitigate friction during the contact of a glide head with a super-smooth disc surface.

Figure 11:
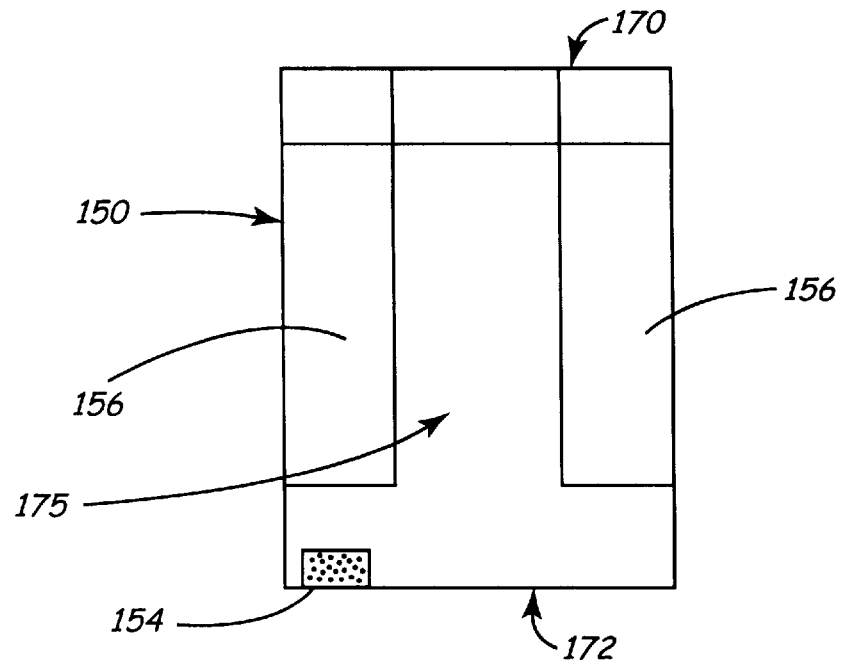
FIG. 11 is a diagrammatic illustration of the ABS of a glide slider having a textured pad at the trailing edge in accordance with an alternative embodiment of the present invention.

FIG. 11 is a diagrammatic illustration of the ABS 175 of a glide head 150 having a textured pad proximate trailing edge 172 in accordance with an alternative embodiment of the present invention. Glide head 150 is defined in part by leading edge 170 and trailing edge 172. ABS 175 is shown with rails 156 disposed on either side of glide head 150. Rails 156 are untextured and responsible for maintaining fly height. Contact pad 154 has a deterministic micro-textured pattern having features with widths of less than about one micron and is responsible for contacting with the media Contact pad 154 is located proximate corner of ABS 175 to reduce the wear of glide head 150.

Figure 12:
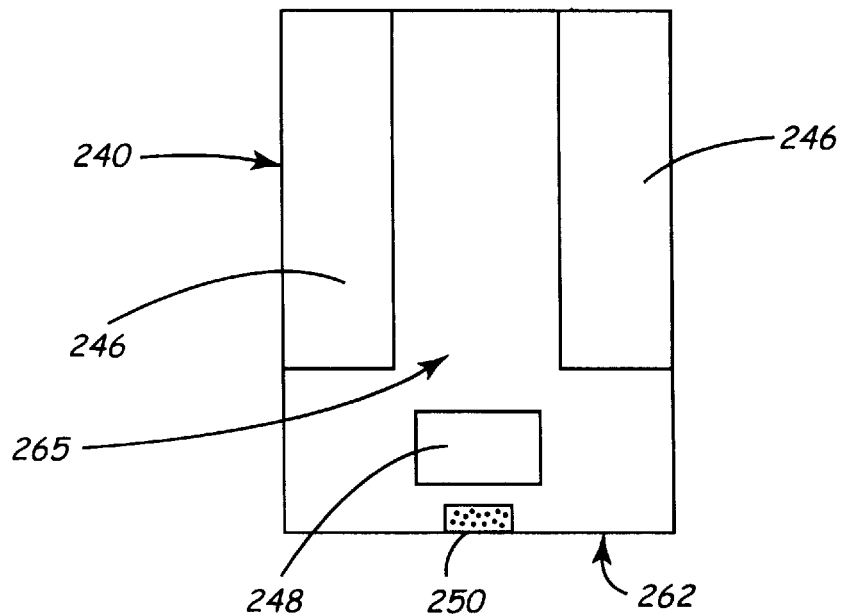
FIG. 12 is a diagrammatic illustration of a glide slider having a textured pad proximate the trailing edge in accordance with another alternative embodiment of the present invention.

FIG. 12 is a diagrammatic illustration of an ABS 265 of a glide head 240 having a contact pad 250 proximate trailing edge 262 in accordance with an alternative embodiment of the present invention. Glide head 240 has non-textured side rails 246 and non-textured center rail 248. Contact pad 250 has a deterministic micro-textured pattern having features with widths of less than about one micron and is located on the ABS 265 between the trailing edge 262 of glide head 240 and center rail 248. Contact pad 250 is responsible for contacting with the media in order to reduce the wear of glide head 240. Although shown as a rectangle, contact pad 250 can be a variety of different shapes and sizes. For example, contact pad could be a circle, square, triangle or other geometric shapes. In addition, contact pad 250 can extend along the entire trailing edge end of ABS 265 or can be any size that will contact with a super-smooth media during characterization. Multiple contact pads may also be used.

Although the present invention has been described with reference to preferred embodiments, workers skilled in the art will recognize that changes may be made in form and detail without departing from the spirit and scope of the invention.

What is claimed is:

1. A glide head for characterizing a super-smooth media surface in a disc drive data storage system, the glide head comprising:

a leading edge;

a trailing edge; and an air bearing surface extending between the leading and trailing edges and comprising:
   a contact region positioned at a trailing edge end of the air bearing surface and providing a surface adapted for contacting the super-smooth media surface; and
   a deterministic micro-textured pattern disposed on the surface of the contact region, the deterministic micro-textured pattern comprising characteristic features substantially all having width and length dimensions of less than about one micron.

2. The glide head of claim 1, wherein the characteristic features are cylindrically shaped and the width comprises a diameter of the cylinder.

3. The glide head of claim 1, wherein the characteristic features are rectangular.

4. The glide head of claim 1, wherein the characteristic features comprise a plurality of peaks and valleys.

5. The glide head of claim 1, wherein the air bearing surface further comprises a rail, wherein the contact region is disposed on the rail.

6. The glide head of claim 5, wherein the air bearing surface further comprises a contact pad disposed on the rail, wherein the contact region is disposed on the contact pad.

7. The glide head of claim 1, wherein the contact region is disposed on a corner of the trailing edge end of the air bearing surface.

8. The glide head of claim 1, wherein the air bearing surface further comprises a center rail, wherein the contact region is disposed between the center rail and the trailing edge end of the air bearing surface.

9. The glide head of claim 1 further comprising a sensor for sensing contact between the glide head and the super-smooth media.

10. A method of producing a glide head for use in characterizing a super-smooth media surface in a data storage system comprising:

providing the glide head; and forming an air bearing surface on the glide head, the air bearing surface including a contact region positioned at a trailing edge end of the air bearing surface and having a surface adapted for contacting the super-smooth media surface, wherein a deterministic micro-textured pattern is formed on the surface of the contact region, the deterministic micro-textured pattern comprising characteristic features substantially all having width and length dimensions of less than about one micron.

11. The method of claim 10, wherein the step of forming the air bearing surface further includes using interference lithography.

12. The method of claim 10, wherein the step of forming includes forming the deterministic micro-textured pattern using one of conventional photolithography and interference lithography.

13. The method of claim 10, wherein forming the air bearing surface further comprises forming a rail, wherein the contact region is disposed on the rail.

14. The method of claim 13, wherein forming the air bearing surface further comprises forming a contact pad on the rail, wherein the contact region is disposed on the contact pad.

15. The method of claim 10, wherein forming the air bearing surface further comprises forming the contact region proximate a corner of the trailing edge end of the air bearing surface.

16. The method of claim 10, wherein forming the air bearing surface further includes forming a center rail, and wherein the contact region is disposed between the center rail and the trading edge end of the air bearing surface.

17. A glide head for characterizing a super-smooth media surface in a disc drive data storage system comprising:

an air bearing surface providing a dedicated contact region at a trailing edge end of the glide head; and micro-textured surface means formed on the contact region for reducing friction between the glide head and the super-smooth media surface, the micro-textured surface means comprising a deterministic micro-textured pattern having characteristic features substantially all having width and length dimensions of less than about one micron.

* * * * *

UNITED STATES PATENT AND TRADEMARK OFFICE
CERTIFICATE OF CORRECTION

PATENT NO. : 6,536,265 B1  Page 1 of 1
DATED : March 25, 2003
INVENTOR(S) : Jorge C. Hanchi et al.

It is certified that error appears in the above-identified patent and that said Letters Patent is hereby corrected as shown below:

Column 2,
Line 52, delete "8A and 8E" and insert -- 8A-8E --.
Line 53, delete "7A and 7E" and insert -- 7A-7E --.

Signed and Sealed this

Sixth Day of May, 2003

JAMES E. ROGAN
*Director of the United States Patent and Trademark Office*